(12) United States Patent
Urbanski

(10) Patent No.: US 12,402,993 B2
(45) Date of Patent: Sep. 2, 2025

(54) HYBRID STYLE DENTURE SYSTEM FOR PARTIAL OR COMPLETE DENTURES

(71) Applicant: Ted Joseph Urbanski, Santa Ana, CA (US)

(72) Inventor: Ted Joseph Urbanski, Santa Ana, CA (US)

(*) Notice: Subject to any disclaimer, the term of this patent is extended or adjusted under 35 U.S.C. 154(b) by 0 days.

(21) Appl. No.: 18/913,909

(22) Filed: Oct. 11, 2024

(65) Prior Publication Data

US 2025/0032230 A1 Jan. 30, 2025

Related U.S. Application Data

(63) Continuation-in-part of application No. 18/195,359, filed on May 9, 2023, now abandoned.

(60) Provisional application No. 63/318,187, filed on Mar. 9, 2022.

(51) Int. Cl.
*A61C 13/265* (2006.01)
*A61C 8/00* (2006.01)
*A61C 13/01* (2006.01)
*A61C 13/271* (2006.01)

(52) U.S. Cl.
CPC .......... *A61C 13/2656* (2013.01); *A61C 13/26* (2013.01); *A61C 8/00* (2013.01); *A61C 13/01* (2013.01)

(58) Field of Classification Search
CPC ... A61C 13/01; A61C 13/225; A61C 13/2255; A61C 13/265; A61C 13/2656; A61C 13/2653; A61C 8/0048; A61C 8/0062
See application file for complete search history.

(56) References Cited

U.S. PATENT DOCUMENTS

| | | | | |
|---|---|---|---|---|
| 5,049,075 | A * | 9/1991 | Barrut | A61C 13/00 433/167 |
| 2009/0075235 | A1 * | 3/2009 | Letcher | A61C 8/0048 433/215 |
| 2014/0178839 | A1 * | 6/2014 | Berger | A61C 13/01 433/173 |
| 2015/0064653 | A1 * | 3/2015 | Grobbee | A61C 8/0048 433/199.1 |
| 2016/0228220 | A1 * | 8/2016 | Collins | A61C 8/0095 |

FOREIGN PATENT DOCUMENTS

| | | | | |
|---|---|---|---|---|
| EP | 2103275 A1 * | 9/2009 | | A61C 13/275 |
| WO | WO-2017106335 A1 * | 6/2017 | | |

* cited by examiner

*Primary Examiner* — Jacqueline T Johanas
*Assistant Examiner* — Shannel Nicole Belk
(74) *Attorney, Agent, or Firm* — Plager Schack LLP; Mark H. Plager; Naomi Mann

(57) ABSTRACT

A dental implant method comprises securing a denture to a denture receiving component installed to a wearer's dental arch, using normal hand force. The denture receiving component includes a first interlocking platform configured to mate lock with a second interlocking platform in the denture to secure the denture. The second interlocking platform is further configured to detach from the first interlocking platform to release the denture using normal hand force. The denture can be fully held in place by the denture receiving component and does not require gum tissue coverage or extraneous elements for support.

11 Claims, 4 Drawing Sheets

HYBRID STYLE DENTURE SYSTEM FOR PARTIAL OR COMPLETE DENTURES

RELATED APPLICATION

This application is a continuation-in-part of U.S. application Ser. No. 18/195,359 filed May 9, 2023, which claims benefit to U.S. Non-Provisional Application No. 63/318,187 filed Mar. 9, 2022, all of which are incorporated by reference herein in their entirety.

BACKGROUND

The present disclosure relates generally to denture systems.

Conventional denture systems may depend on soft tissue coverage for support and may further include parts that wear and need replacement. Additionally, such systems tend to trap food and debris, and may be costly to produce. As such, there is a need for an improved system that overcomes at least the above-mentioned limitations of the prior art.

SUMMARY

According to various embodiments, disclosed is a dental implant system, comprising a denture receiving component configured to install into a user's upper or lower dental arch; and a denture configured to releasably interlock with the denture receiving component via an interlocking platform of the denture, wherein the denture comprises false teeth coupled to the interlocking platform.

In some embodiments, the false teeth are supported on a molded gum component. In certain embodiments, the molded gum component comprises a trench configured to receive the interlocking platform. In some embodiments, the denture receiving component includes elongated slots or ridges configured to interlock with mating ridges or slots within the interlocking platform of the denture. In certain embodiments, the denture receiving component and the interlocking platform of the denture are each made of a high-performance polymer material. In some embodiments, an edge border of the denture does not extend more than 1 mm over a base perimeter or edge of the attachment component. In further embodiments, the edge border of the denture approximately aligns with the base perimeter of the attachment component.

According to further embodiments, disclosed is a denture attachment method which may comprise securing a denture to a denture receiving component, the denture receiving component being installed to a wearer's dental arch, wherein the denture receiving component includes a first interlocking platform, the denture includes false teeth coupled to a second interlocking platform, and the second interlocking platform is configured to mate lock with the first interlocking platform to secure the denture using normal hand force. In further embodiments, the second interlocking platform is configured to detach from the first interlocking platform to release the denture using normal hand force, and the denture configured to be fully held in place by the denture receiving component without requiring neither gum tissue coverage nor extraneous elements for support.

In some embodiments, the first interlocking platform comprises at least one of a ridge and/or a slot, wherein the second interlocking platform comprises at least one of a slot and/or a ridge configured to mate and releasably snap lock with the ridge and/or slot in the first interlocking platform. In some embodiments, the at least one ridge and the at least one slot are each less than approximately 2 mm in width. In certain embodiments, the at least one ridge and the at least one slot are each less than approximately 2 mm in depth. In some embodiments, the false teeth are supported on a molded gum component of denture, wherein the molded gum component incorporates the second interlocking platform. In some embodiments, the denture receiving component and the denture span a part of the dental arch or the entire dental arch of the wearer. In certain embodiments, the first interlocking platform and the second interlocking platform are made of a high-performance polymer (HPP). In some embodiments, a base edge of the denture is configured to remain approximately at or above the gum line when the denture is secured to denture receiving component. In certain embodiments, a distance between a base edge of the denture and a base edge of the denture receiving component is less than approximately 1 mm when the denture is secured to denture receiving component. In some embodiments, a base edge of the denture is configured to form a seal against the denture receiving component when the denture is secured to denture receiving component.

In certain embodiments, the first interlocking platform and the second interlocking platform each include an anterior region and left and right posterior regions, with a transition zone therebetween, wherein the posterior regions are wider than the anterior regions. In some embodiments, the first interlocking platform comprises at least one side slot on each of right and left posterior regions of first interlocking platform, and at least one center slot across an anterior region of the first interlocking platform, and wherein the second interlocking platform comprises at least one side ridge on each of right and left posterior regions of the second interlocking platform and at least one center ridge across an anterior region of the second interlocking platform, wherein each side ridge of the second interlocking platform is configured to interlock with a side slot in a corresponding region of the first interlocking platform, and wherein the center ridge of the second interlocking platform is configured to interlock with the center slot of the first interlocking platform. In some embodiments, the method further comprises implanting the denture receiving component to the wearer's dental arch using attachment screw engaged through a screw access hole within the denture receiving component.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Creating a removable denture that can maintain substantially the same size and shape as the original natural teeth, and which does not require gum tissue support and coverage has long been a significant endeavor in the field of dentistry. Many attempts have been made in achieving this goal, however, conventional denture pieces are typically far larger and bulkier in size than the original natural teeth they replace due to the tissue support and coverage required. Hybrid dentures, on the other hand, can maintain a profile comparable in size and shape to the original natural teeth, but require removal by a dental professional.

Figure 1:
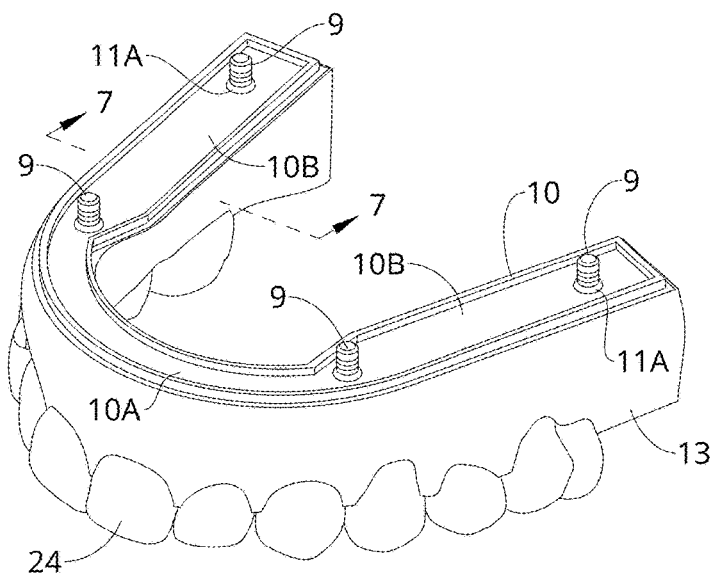
FIG. 1 is perspective view of a denture attachment system shown assembled, according to various embodiments.
Figure 2:
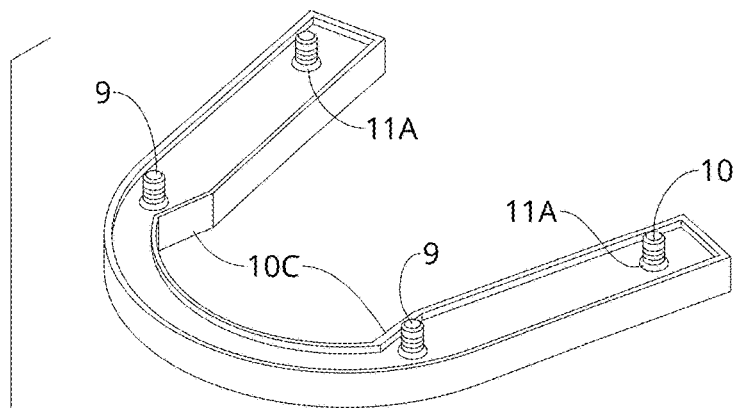
FIG. 2 is a perspective view of the denture attachment system, shown disassembled according to certain embodiments.
Figure 2:
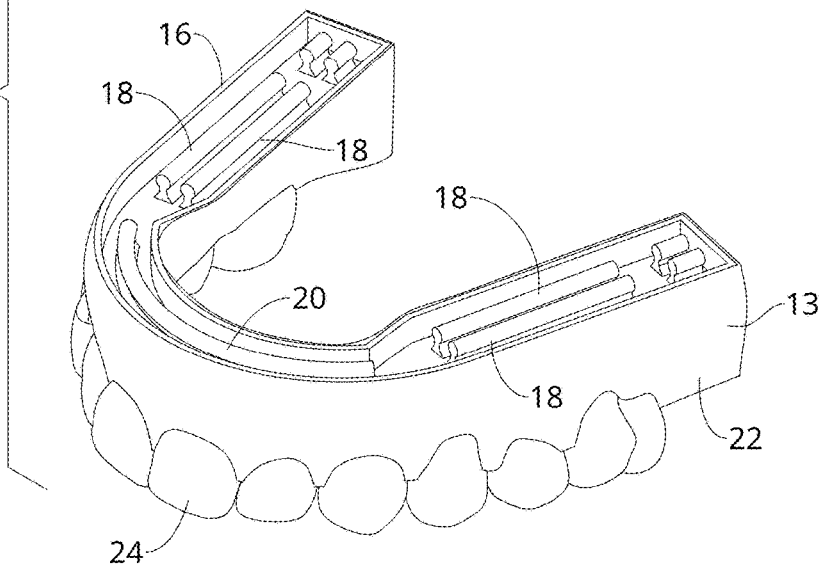
Figure 3:
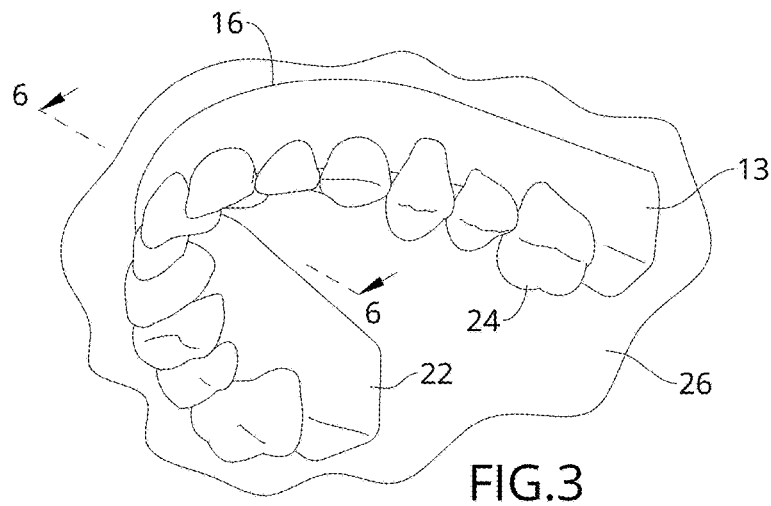
FIG. 3 is a bottom perspective view of the denture attachment system shown installed in a user's mouth.
Figure 4:
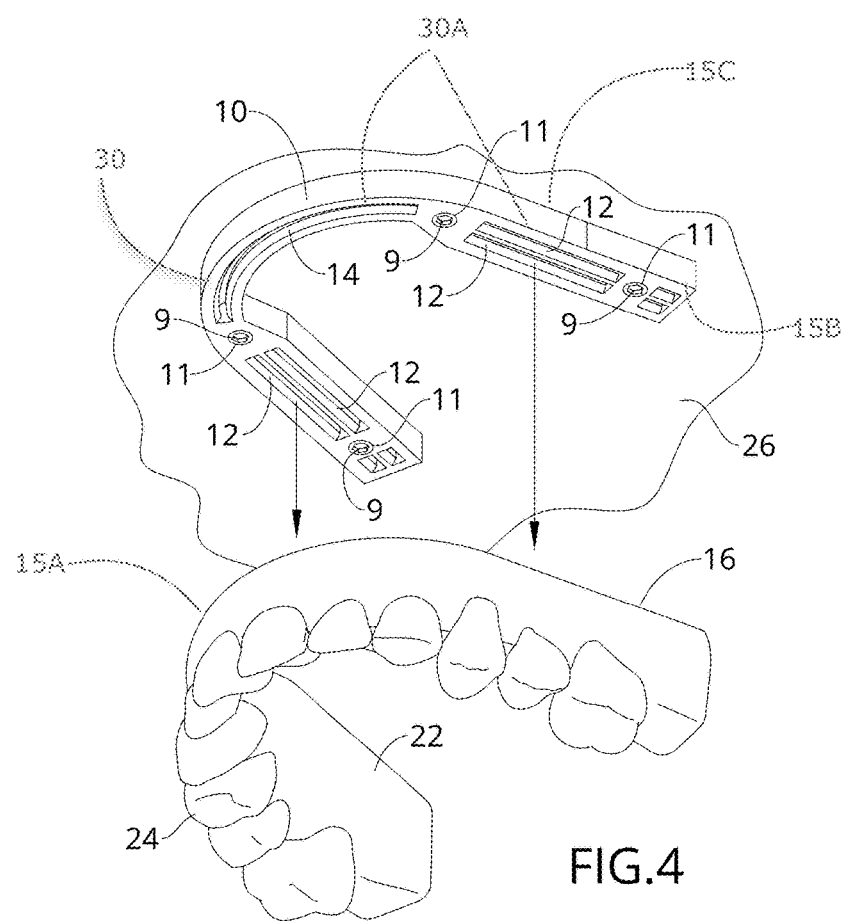
FIG. 4 is a bottom perspective view illustrating disassembly of the system components, according to certain embodiments.
Figure 5:
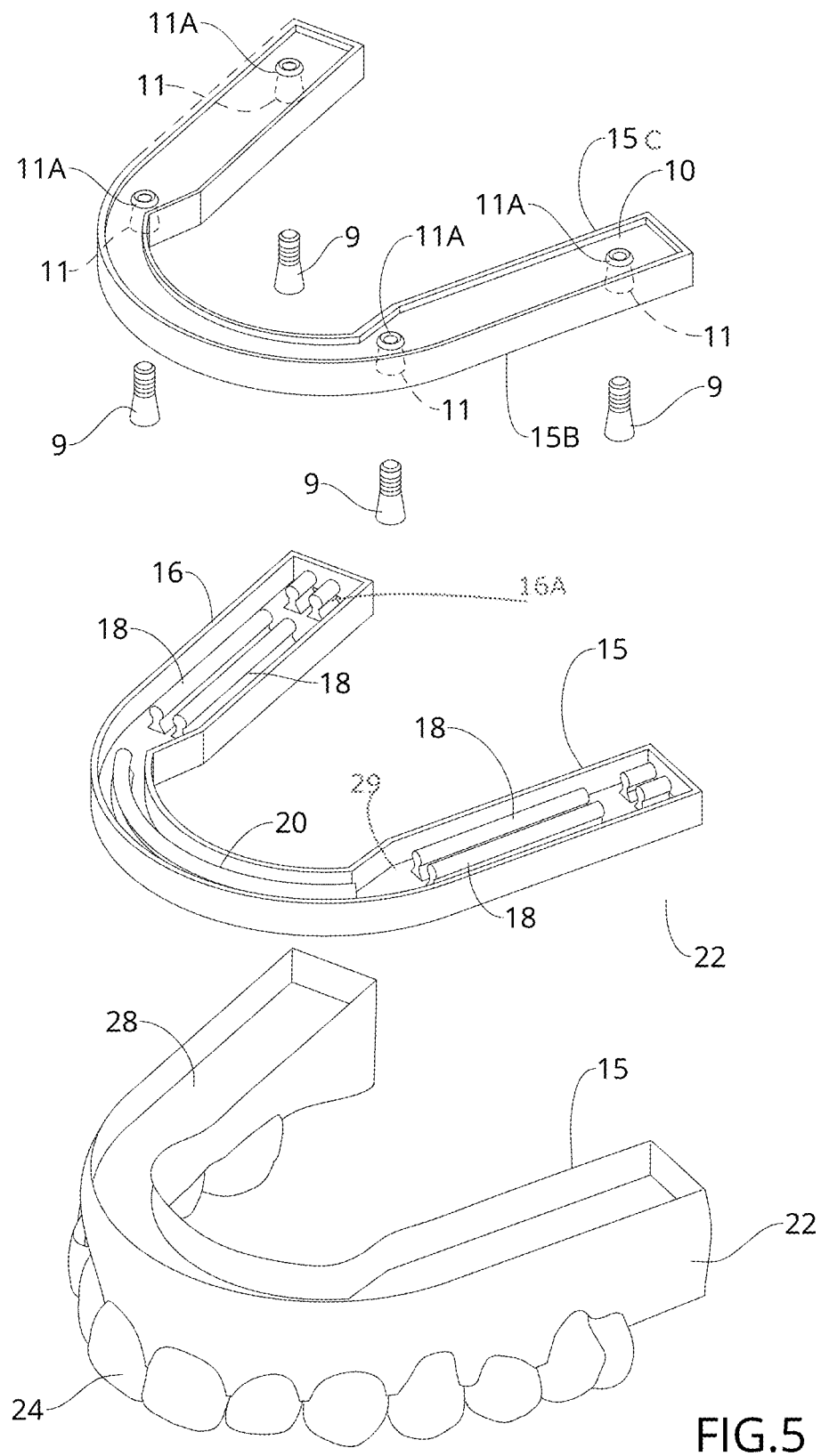
FIG. 5 is an exploded view of the dental implant system, according to certain embodiments.
Figure 6:
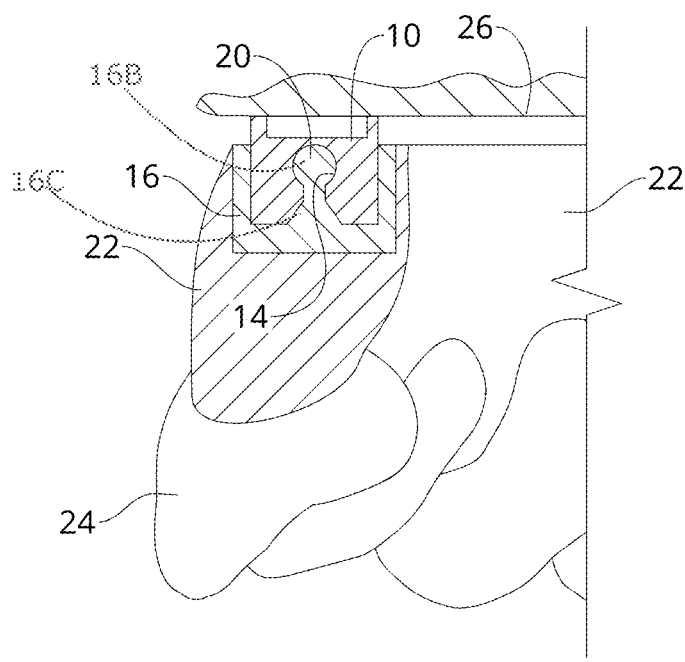
FIG. 6 is a section view taken along line 6-6 in FIG. 3.
Figure 7:
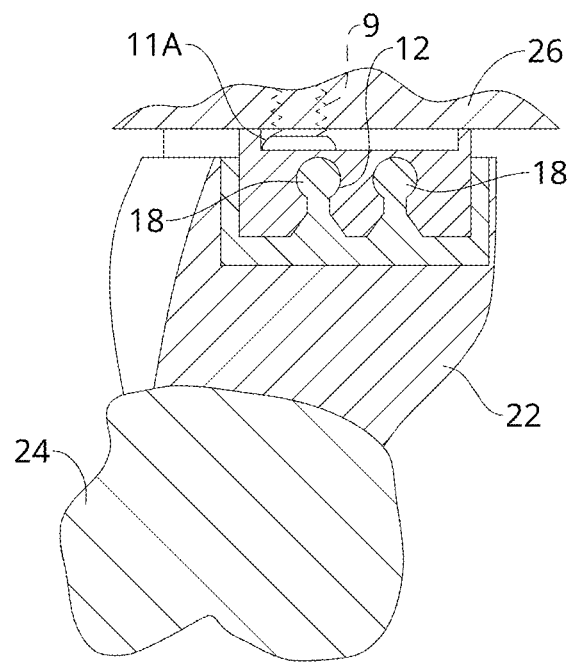
FIG. 7 is a section view taken along line 7-7 in FIG. 1.

With reference to FIGS. 1-7, the disclosed subject matter addresses these deficiencies by providing a denture attachment method and system 2 comprising a first component 10 (also referred to as "denture receiving component 10") which is implanted and provides a first interlocking platform 30, and a second component 13 (also referred to as "denture 13") which supports one or more false teeth 24 and provides a second interlocking platform 16 configured to mate lock with first interlocking platform 30. The two interlocking platforms 30, 16 enable a fully supported denture or more specifically, a hybrid-type denture system that eliminates the need for gum coverage and extraneous support elements. Additionally, unlike traditional hybrid dentures wherein the denture may be screwed in and requires professional removal, the disclosed system enables the denture to be removed by the patient for at home cleaning.

In certain embodiments, denture receiving component 10 is configured to install into a user's upper or lower dental arch 26. Denture 13 is configured to interlock with denture receiving component 10 via a releasable interlocking connection between first interlocking platform 30 and second interlocking platform 16.

In some embodiments, false teeth 23 may be supported on a molded gum component 22 of denture 13. In some embodiments, molded gum component 22 and second interlocking platform 16 may be separate components that are permanently bonded, but not necessarily so. In one embodiment, molded gum component 22 may comprise a trench 28 which receives interlocking platform 16, wherein interlocking platform 16 and molded gum component may be bonded to form a unitary denture piece with aligned base edges 15 forming a common base edge 15A (i.e., an edge border) of denture 13. In certain embodiments, denture receiving component 10 and denture 13 may span the entire dental arch for a full denture system. In other embodiments, denture receiving component 10 and denture 13 may span a part of the dental arch for partial dentures. In certain embodiments, denture receiving component 10 and denture 13 of a full denture system include an anterior region 10A and left and right posterior regions 10B, with a transition zone 10C therebetween, wherein posterior regions 10B may be wider than anterior region 10A.

In certain embodiments, first interlocking platform 30 provides slot(s) 30A, which may be elongated, and are configured to interlock or snap lock with mating ridge(s) 16A in second interlocking platform 16. In certain embodiments, first interlocking platform 30 has a flat distal surface in which the slot(s) 30A are formed. In certain embodiments, second interlocking platform 16 has a flat distal surface from which the ridges 16A extend, as shown. In a further embodiment, ridges 16A may be formed within a trench 29 in first interlocking platform 16. Trench 29 may be approximately congruent with trench 28 of molded gum component 22, and may be structured to fit precisely within trench 28. In further embodiments, ridges 16A may extend up to, but not past edge 15.

In some embodiments, each ridge 16A may comprise an expanded locking head 16B which extends from a narrowing base 16C. Each slot 30A provides a corresponding hollow configured to receive ridge 16A. The expanded locking head 16B of ridge 16A enables it to be lockably captured within the slot when pushed in, and can further be released by pulling and/or twisting. In one embodiment as depicted, expanded locking head 16B has a bulbous profile, and base 16C is triangular. It shall be appreciated however, that other geometric configurations may be used in alternate embodiments. In certain embodiments, denture receiving component 10 may be about ¼-inch (about 6.25 mm) in width, and bout ⅛-inch (about 2.75 mm) high, wherein the arch size depends on the size of the patient's jaw/mouth. In further embodiments, no part of the denture 13 is wider than the nature molar tooth of the wearer and/or a molar tooth in the denture.

In certain embodiments, the slots and mating ridges may be less than approximately 2 mm in width, or approximately 1 mm to approximately 2 mm in width, or approximately 1.25 mm to approximately 1.5 mm in width. In further embodiments, the slots and mating ridges may be less than approximately 2 mm in depth, or approximately 1 mm to approximately 2 mm in depth, or approximately 1.25 mm to approximately 1.5 mm in depth. As such, denture 13 may be snapped into place or popped out using normal physical force, wherein the attachment strengths/resistance of the denture may be adjusted based on the needs of the patient. It shall be appreciated that in alternate embodiments, said ridge(s) may be in the first interlocking platform 30 and the slot(s) may be in the second interlocking platform 16.

In some embodiments, slot(s) 30A in first interlocking platform 30 of denture receiving component 10 may comprise at least one side slot 12 on each of the right and left posterior regions 10B of first interlocking platform 30/denture receiving component 10, and at least one center slot 14 spanning across anterior region 10A. In certain embodiments, ridge 16A in second interlocking platform 16 may comprise at least one side ridge 18 on each of the right and left posterior regions 10B of second interlocking platform 16/denture 13 and at least one center ridge 20 across anterior region 10A, wherein each side ridge 18 is configured to interlock with a corresponding side slot 12 of denture receiving component 10 and center ridge 20 is configured to interlock with center slot 14. In one embodiment, denture receiving component 10 may comprise two parallel side slots 12 and interlocking platform 16 may comprise two parallel side ridges 18 on each of the left and right posterior regions 10B. Denture receiving component 10 may further comprise a single center slot 14 and interlocking platform 16 may comprise a single center ridge 20 configured to interlock with center slot 14. It shall be appreciated that any number of slots/ridges may be used in alternate embodiments, and that the slots/ridges may be of different sizes and dimensions in alternate embodiments, depending on the needs and/or preferences of the patient.

In certain embodiments, denture receiving component 10/first interlocking platform 30 and denture 13 and/or second interlocking platform 16 may be made of a high-performance polymer (HPP) and/or high performance dental polymers (HPDP), which may comprise polyetheretherketone (PEEK), Polyetherketoneketone PEKK, and/or Polyaryletherketone PAEK. Such materials may comprise ketone and or aryl groups linked to a basic benzene ring, and may be sold under the trade names ULTAIRE®, PEEKTON®, FLEXCERA®, and/or TRUSANA®, as is known. In some embodiments, denture receiving component 10 and interlocking platform 16 may both be made of the same material, but not necessarily so. In further embodiments, molded gum component 22 and false teeth 23 may also be made of a HPP/HPDP material, which may be the same material from which denture receiving component 10 and interlocking platform 16 are made, but not necessarily so. In further embodiments, denture 13 (i.e., including second interlocking platform 16, molded gum component 22, and false teeth 23 may be made entirely from HPP/HPDP. In certain embodiments, the components may be 3-D printed, molded, or milled from the HPP/HPDP material(s) to fit the dental arch 26 (upper or lower) or portion of the dental arch to which dental implant system 2 is installed. It shall be appreciated that in alternate embodiments, the disclosed system may utilize other suitable HPP materials in alternate embodiments, which are currently available or may become available with emerging technology.

In some embodiments, denture receiving component 10 is configured to install into the dental arch of the user via attachment screws 9. In one embodiment, attachment screws 9 may comprise titanium Rosen® implant screws, which may be engaged through screw access holes 11 provided within denture receiving component 10 and installed into an implanted post within the gums and/or jawbone. In further embodiments, adapter sleeves 11A (titanium multi-abutments) may be provided within screw access holes 11 for threadably receiving screws 9. In some embodiments, adapter sleeves 11A may be threadably engaged with the implanted posts. In other embodiments, adapter sleeves 11A may be extensions of the implanted posts. In further embodiments, attachment screws 9 and adapter sleeves 11A are configured to situate within denture receiving component 10 at or below a distal edge 15B of the attachment component. In certain embodiments, an denture receiving component 10 for a full upper and/or lower dental system may comprise 4 screw access holes 11, including a first pair positioned within transition zone 10C and a posterior pair located behind side slots 12 as shown. It shall be appreciated however that the positioning of the attachment screws 9 may vary depending on the particular needs and/or preferences of the patient.

In certain embodiments, base edge 15A of denture 13 is configured to remain approximately at or above the gum line when denture 13 is attached to denture receiving component 10. In one embodiment, base edge 15A of denture 13 does not extend more than 1 mm over base edge 15C (i.e., base perimeter) of denture receiving component 10. In further embodiments, a distance between base edge 15A of denture 13 and base edge 15C of denture receiving component 10 may be less than approximately 1 mm. As such, the base edge 15A of denture 13 essentially avoids palate and gum coverage that typically require plastic for stability. This greatly reduces microbial contamination of patient's oral tissue. Furthermore, base edge 15A of denture 13 and base edge 15C of denture receiving component 10 are configured to substantially align to form a common top edge of dental implant system 2. In certain embodiments, base edge 15A may form a seal (similar to an O-ring seal) against denture receiving component 10 so that debris are prevented from getting between the components.

As such, the disclosed system provides a non-metal, non-plastic dental implant supported platform for partial or complete hybrid dentures that leaves the soft tissue of a patient's mouth/gums, and side of the face (i.e., palate) uncovered. The denture(s) may simply snap into place on denture receiving component 10 without any plastic, or pink tissue material. The disclosed system is further easily removable for cleansing and eliminates accumulation of food and debris between the dentures. In contrast to conventional hybrid denture systems, the disclosed system does not need to be removed by the doctor for plaque removal and screw renewal, providing a considerable convenience and saving time and money over conventional systems.

In certain embodiments, the disclosed system may be implemented by surveying the gums and/or bone of a patient via a 3-D scan to determine precise implant placement of the posts as well as correct arch size and shape for forming the denture platforms. In some embodiments, a regular scan may also be used. Once the posts are surgically implanted, the denture receiving component 10 may then be secured to the posts via attachment screws 9. In certain embodiments, 4 posts may be used. In some embodiments, another scan using scan bodies attached to the implants may also be made once the 4 posts are implanted. This provides the correct screw angle to be placed on the receiving component. Once the receiving component is installed, the denture may simply be snapped in and popped out by the patient.

Thus, dental system 2 enables easy home maintenance by the patient/wearer using normal brushing, sonic, and/or water pick techniques, and the like. Unlike hybrid dentures which are screwed into place, the denture is removable from the first implanted component by the wearer using normal hand force. Accordingly, the dentures/false teeth may be cleaned at home without requiring removal by a dental professional.

Additionally, system 2 may consist essentially of only the first component 10 which is implanted via screws, and the second component 13 which snap locks with the first component with no extraneous elements required for stability and attachment. Denture receiving component 10 provides a miniature platform that mate locks with denture 13 to firmly maintain the position and orientation between the two components. Denture 13 provides an arch of teeth of approximately the same size of the original natural teeth. Thus, the components are fully constrained relative to each other, with the denture 13 keeping the gum tissues uncovered. This is critically vital due to the numerous viruses, pathogenic odor producing bacteria, and spores which colonize under denture covered surfaces. The reduced size of the denture and secure attachment provides more comfort in eating and speaking, and fosters an overall feeling of natural well-being.

It shall be appreciated that components of dental implant system 2 may be manufactured and assembled using any known techniques in the field. In certain embodiments, all parts may be milled and/or 3-D printed, making the disclosed system cost effective. It shall be appreciated that the disclosed device and system can have multiple configurations in different embodiments. It shall be appreciated that the device and system described herein may comprise any alternative known materials in the field and be of any size and/or dimensions.

It shall be understood that the orientation or positional relationship indicated by terms such as "upper", "lower", "front", "rear", "left", "right", "top", "bottom", "inside", "outside" is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles "a" and "an" are intended to include one or more items and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A denture attachment method, comprising:
    securing a denture to a denture receiving component, the denture receiving component being installed to a dental implant embedded in a wearer's dental arch using at least one attachment screw engaged through a screw access hole within the denture receiving component,
    wherein the denture receiving component includes a first interlocking platform,
    wherein the denture includes false teeth coupled to a second interlocking platform,
    wherein the second interlocking platform is configured to mate lock with the first interlocking platform to secure the denture using normal hand force,
    wherein the second interlocking platform is configured to detach from the first interlocking platform to release the denture using normal hand force,
    wherein the denture is configured to be fully held in place by the denture receiving component and does not require neither gum tissue coverage nor extraneous elements for support,
    wherein the first interlocking platform comprises at least one of a ridge and/or a slot, wherein the second interlocking platform comprises at least one of a slot and/or a ridge configured to mate and releasably snap lock with the ridge and/or slot in the first interlocking platform,
    wherein the first interlocking platform and the second interlocking platform are made of a high-performance polymer (HPP) that enables the ridge and/or slot in the first interlocking platform to mate and releasably snap lock with the slot and/or ridge in the second interlocking platform,
    wherein a base edge of the denture is configured to remain approximately at or above the gum line when the denture is secured to denture receiving component, and
    wherein the base edge of the denture is configured to form a seal against the denture receiving component when the denture is secured to denture receiving component.

2. The denture attachment method of claim 1, wherein the at least one ridge and the at least one slot are each less than approximately 2 mm in width.

3. The denture attachment method of claim 1, wherein the at least one ridge and the at least one slot are each less than approximately 2 mm in depth.

4. The denture attachment method of claim 1, wherein the false teeth are supported on a molded gum component of denture, wherein the molded gum component incorporates the second interlocking platform.

5. The denture attachment method of claim 1, wherein the denture receiving component and the denture span a part of the dental arch or the entire dental arch of the wearer.

6. The denture attachment method of claim 1, wherein a distance between a base edge of the denture and a base edge of the denture receiving component is less than approximately 1 mm when the denture is secured to denture receiving component.

7. The denture attachment method of claim 1, wherein the first interlocking platform and the second interlocking platform each include an anterior region and left and right posterior regions, with a transition zone therebetween, wherein the posterior regions are wider than the anterior regions.

8. The denture attachment method of claim 7, wherein the first interlocking platform comprises at least one side slot on each of right and left posterior regions of first interlocking platform, and at least one center slot across an anterior region of the first interlocking platform, and
    wherein the second interlocking platform comprises at least one side ridge on each of right and left posterior regions of the second interlocking platform and at least one center ridge across an anterior region of the second interlocking platform,
    wherein each side ridge of the second interlocking platform is configured to interlock with a side slot in a corresponding region of the first interlocking platform, and
    wherein the center ridge of the second interlocking platform is configured to interlock with the center slot of the first interlocking platform.

9. The denture attachment method of claim 1, wherein the first interlocking platform provides at least one elongated slot, configured to snap lock with at least one elongated mating ridge in the second interlocking platform,
    wherein the first interlocking platform has a flat distal surface in which the at least one elongate slot is formed, and
    wherein the second interlocking platform has a flat distal surface from which the at least one elongated mating ridge extends,
        wherein the at least one each ridge comprises an expanded locking head which extends from a narrowing base, and
        wherein the at least one slot provides a corresponding hollow configured to receive the ridge.

10. The denture attachment method of claim 1, wherein no part of the denture is wider than the natural molar tooth of the wearer and/or a molar tooth in the denture.

11. The denture attachment method of claim 1, wherein the first interlocking platform and the second interlocking platform each include an anterior region and left and right posterior regions, with a transition zone therebetween, wherein the posterior regions are wider than the anterior regions, wherein the first interlocking platform comprises at least one pair of elongated side-by-side side slots on each of right and left posterior regions of first interlocking platform, and one elongated center slot across an anterior region of the first interlocking platform, and wherein the second interlocking platform comprises at least one pair of elongated side-by-side side ridges on each of right and left posterior regions of the second interlocking platform and one elongated center ridge across an anterior region of the second interlocking platform, wherein each side ridge of the second interlocking platform is configured to interlock with a side slot in a corresponding region of the first interlocking platform, and wherein the center ridge of the second interlocking platform is configured to interlock with the center slot of the first interlocking platform.

\* \* \* \* \*